(12) United States Patent
Karp

(10) Patent No.: US 12,179,099 B2
(45) Date of Patent: Dec. 31, 2024

(54) METHOD AND SYSTEM FOR PROCESSING GENDER VOICE COMPENSATION

(71) Applicant: Sony Interactive Entertainment LLC, San Mateo, CA (US)

(72) Inventor: Sarah Karp, Foster City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 251 days.

(21) Appl. No.: 17/826,935

(22) Filed: May 27, 2022

(65) Prior Publication Data

US 2023/0381643 A1    Nov. 30, 2023

(51) Int. Cl.
| | |
|---|---|
| A63F 13/424 | (2014.01) |
| A63F 13/215 | (2014.01) |
| A63F 13/40 | (2014.01) |
| G10L 15/06 | (2013.01) |
| G10L 15/16 | (2006.01) |
| G10L 15/22 | (2006.01) |
| G10L 15/30 | (2013.01) |
| G10L 21/013 | (2013.01) |

(52) U.S. Cl.
CPC ............ *A63F 13/40* (2014.09); *A63F 13/215* (2014.09); *G10L 15/063* (2013.01); *G10L 15/16* (2013.01); *G10L 15/22* (2013.01); *G10L 15/30* (2013.01); *G10L 21/013* (2013.01); G10L 2015/223 (2013.01); G10L 2021/0135 (2013.01)

(58) Field of Classification Search
None
See application file for complete search history.

(56) References Cited

U.S. PATENT DOCUMENTS

| | | | |
|---|---|---|---|
| 2004/0078195 A1 | 4/2004 | Oda et al. | |
| 2005/0273323 A1 | 12/2005 | Inagaki | |
| 2020/0384362 A1* | 12/2020 | Shah | A63F 13/424 |
| 2021/0225357 A1* | 7/2021 | Zhao | G10L 15/26 |

OTHER PUBLICATIONS

Intl Search & Written Opinion PCT/US2023/067415, dated Aug. 18, 2023, total 11 pages.
Li Lee et al: Speaker normalization using efficient frequency warping procedures, 1996 IEEE International Conference on Acoustics, Speech, and Signal Processing—Proceedings. (ICASSP). Atlanta, May 7-10, 1996; [IEEE International Conference on Acoustics, Speech, and Signal Processing—Proceedings. (ICASSP)], New York, IEEE, US, vol. 1, Jan. 1, 1996, pp. 353-356, XP002093540, DOI: 10.1109/ICASSP.1996.541105 ISBN: 978-0-7803-3193-8, p. 353, paragraphs 1,7,10, p. 354, paragraphs.

(Continued)

*Primary Examiner* — Damon J Pierce
(74) *Attorney, Agent, or Firm* — PENILLA IP, APC

(57) ABSTRACT

A method for gaming. The method includes receiving an audio command used for controlling game play of a video game for a player, wherein the audio command originates from the player. The method includes providing the audio command to an artificial intelligence (AI) model trained to normalize one or more sounds of the player to one or more expected sounds of the video game. The method includes normalizing the audio command using the AI model to control the game play.

17 Claims, 4 Drawing Sheets

(56) References Cited

OTHER PUBLICATIONS

Huang X D et al: "Connectionist speaker normalization and its applications to speech recognition", Neural Networks for Signal Processing Y1991., Proceedings of the 1991 IEEE Workshop Princeton, NJ, USA Sep. 30-Oct. 1, 1991, New York, NY, USA, IEEE, US, Sep. 30, 1991, pp. 357-366, XO010048933 DOI: 10.1109/NNSP.1991.239506 ISBN: 978-0-7803-0118-4, p. 357, paragraphs 1,2 eq. (1); p. 358, paragraphs 1,3,4 p. 359, paragraphs 2; figure 1 p. 360, paragraphs 2,3; figure 2 p. 361, paragraphs.

* cited by examiner

METHOD AND SYSTEM FOR PROCESSING GENDER VOICE COMPENSATION

TECHNICAL FIELD

The present disclosure is related to gaming, and more specifically to the classification of online gaming activity using artificial intelligence to perform gender voice compensation, such as when compensating for commands performed by different genders.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop computers, laptop computers, mobile phones, etc.

Controlling execution of a video game may be performed using audio commands. More specifically, users interacting with video games will be required to provide voice input. The voice input can include a combination of words or phrases. Sometimes, these words or phrases result in variations in the enunciation of the words and phrases depending on the user. For example, these variations may be due to the pitch in the user's voice. Typically, a woman's voice has a higher pitch than a man's voice, and the resulting enunciation of these words or phrases can be substantially different. As a result, some words or phrases uttered by a woman may not be understood, since a system or video game may be expecting the pitch and sound that is typically uttered by a male.

It is in this context that embodiments of the disclosure arise.

SUMMARY

Embodiments of the present disclosure relate to systems and methods for training and implementing an artificial intelligence (AI) model that is configured to perform gender voice compensation, such as when compensating for commands performed by different genders. The AI model is trained using a deep learning engine configured to detect differences in the enunciation of specific words or combinations of letters and/or words. In that manner, audio commands from a player of any gender can be normalized to expected commands known to a corresponding video game for execution.

In one embodiment, a method for gaming is disclosed. The method including receiving an audio command used for controlling game play of a video game for a player, wherein the audio command originates from the player. The method including providing the audio command to an artificial intelligence (AI) model trained to normalize one or more sounds of the player to one or more expected sounds of the video game. The method including normalizing the audio command using the AI model to control the game play.

In another embodiment, a non-transitory computer-readable medium storing a computer program for implementing a method for gaming is disclosed. The computer-readable medium including program instructions for receiving an audio command used for controlling game play of a video game for a player, wherein the audio command originates from the player. The computer-readable medium including program instructions for providing the audio command to an artificial intelligence (AI) model trained to normalize one or more sounds of the player to one or more expected sounds of the video game. The computer-readable medium including program instructions for normalizing the audio command using the AI model to control the game play.

In still another embodiment, a computer system is disclosed, wherein the computer system includes a processor and memory coupled to the processor and having stored therein instructions that, if executed by the computer system, cause the computer system to execute a method for gaming. The method including receiving an audio command used for controlling game play of a video game for a player, wherein the audio command originates from the player. The method including providing the audio command to an artificial intelligence (AI) model trained to normalize one or more sounds of the player to one or more expected sounds of the video game. The method including normalizing the audio command using the AI model to control the game play.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
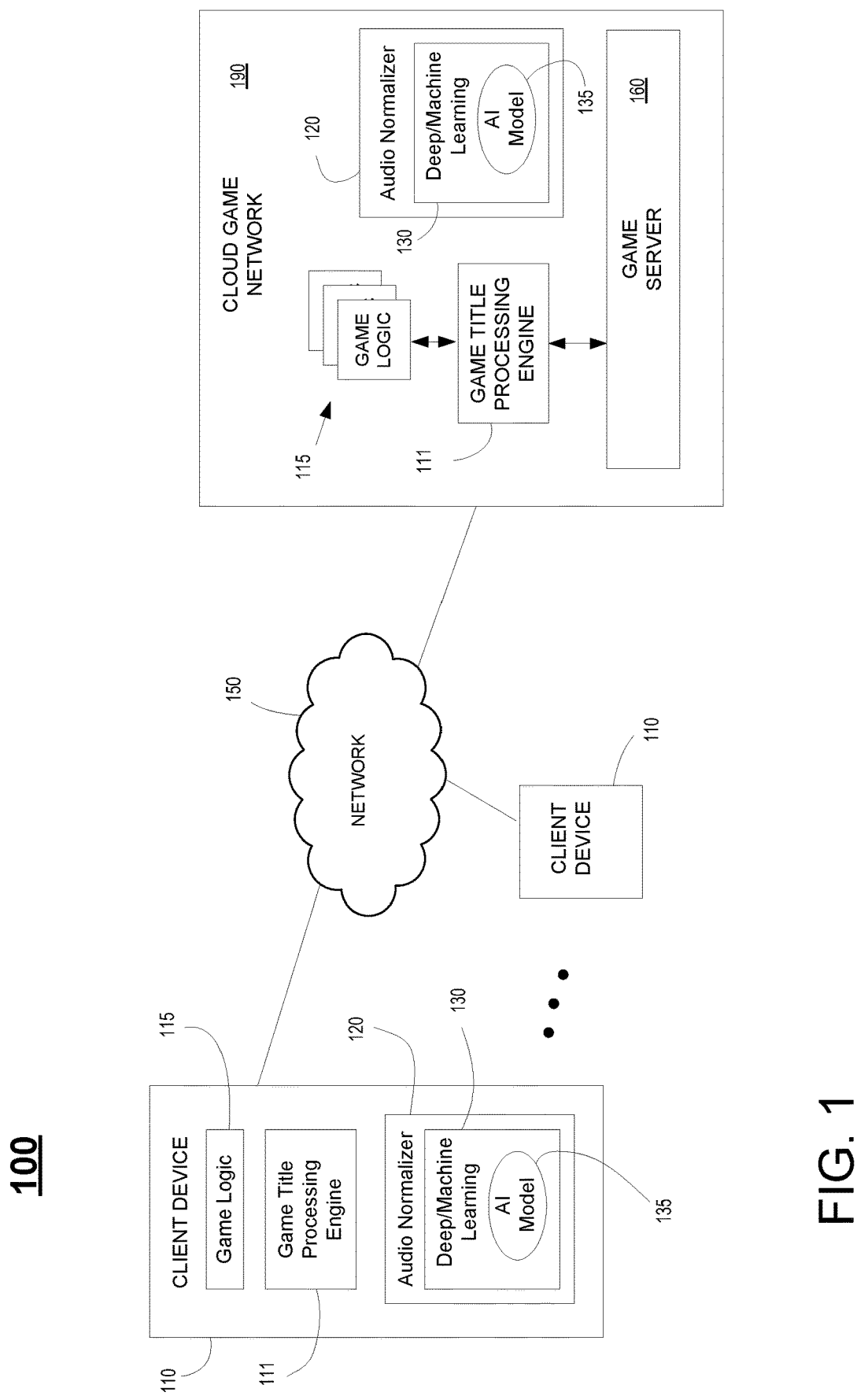
FIG. 1 illustrates a system configured to implement an artificial intelligence model that is configured, in part, to perform gender voice compensation, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing artificial intelligence (AI) techniques to train and/or build a machine learning model configured to perform gender voice compensation. In particular, artificial intelligence (e.g., machine learning, etc.) is used to detect differences in the enunciation of specific words or combinations of letters and words or sounds. The AI and or machine learning process can be executed in real time during gameplay of corresponding video games, and can make adjustments based on the learned differences in the inputs provided by a corresponding player. For example, the adjustments may apply a normalization to audio input to the game, so that differences between voices of men or women or children or categories of users, or voices with different pitches can be filtered and/or processed using an AI model associated with the corresponding user, and the correct audio input can be recognized by the video game. Further, the AI model can be used to translate an uttered enunciation of a sound into an expected enunciation of the sound for a native or corresponding game, wherein the uttered sound may be intended to mimic the corresponding expected sound, or may be a completely fabricated sound that is intended by the player to represent the expected sound, such as when the player is assigning a given sound to correspond to an expected sound.

Advantages of the methods and systems configured to implement AI techniques to train and/or build a machine learning model configured to perform gender voice compensation include reducing frustrations of players whose audio commands originally are misinterpreted or misapplied during execution of a corresponding video game but are now correctly translated for proper execution of game commands according to wishes of the player. Additional advantages include improved game play as additional control mechanisms used for communicating game commands that expand on the usage of hand controllers can be implemented. These additional control mechanisms may provide a different experience to the player, such as providing a more realistic gaming experience by using audio commands instead of commands generated using hand controllers. For instance, the player may feel more immersed or more connected in a video game when providing instructions via voice commands (e.g., gaining a visceral feel when playing the video game). In addition, another advantage may include providing quicker responses, such as when delivering commands. For example, more audio commands may be given in a given period of time when compared to hand controlled commands. Further, other advantages may include an expansion in the number of commands. For example, hand control commands are limited by the number of control sequences available (as influenced by the number of types of controller knobs and/or input mechanisms, as well as the number of moves in a controller sequence (i.e., there cannot be too many moves in a sequence otherwise the command may prove to be difficult to implement by the player). On the other hand, there are many more commands that can be generated using audio commands of single or double or even triple syllables. Even more commands may be generated using even higher number of syllables. This expansion of available commands may introduce a new realm of gaming not possible when entering commands through hand held controllers, for example. Another advantage includes less fatigue on the player, especially in terms of hand usage. Instead of failing to execute commands properly when the hands of a player are fatiguing during an intense period of gaming, or after an extended period of gaming, audio commands may prove to be less fatiguing. In particular, a player may be able to effectively give voice commands for continuous periods of time that are longer, or for extended periods of time that may include both intense and less intense controller input sub-periods when gaming.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

With the above general understanding of the various embodiments, example details of the embodiments will now be described with reference to the various drawings.

FIG. 1 illustrates a system 100 configured to implement an artificial intelligence (AI) model using artificial intelligence (e.g., through application of machine learning) that is configured to perform, in part, gender voice compensation, in accordance with one embodiment of the disclosure. For example, the AI model is configured to normalize audio sounds and/or commands, such that they are known to an executing video game and/or system executing the video game.

As shown, system 200A may providing gaming over a network 150 for and between one or more client devices 110. In particular, system 100 may be configured to provide gaming via a cloud game network 190, wherein the game is being executed remote from a corresponding client device 110 (e.g., acting as a thin client) of a corresponding user that is playing the video game, in accordance with one embodiment of the present disclosure.

In particular, system 100 may provide gaming control to one or more users playing one or more video games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

Network 150 may include one or more communication technologies. In some embodiments, network 150 may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 190 includes a game server 160 that provides access to a plurality of video games. A game server may be used to perform the operations of the durational information platform for video game players, in some embodiments. Most video games played over the Internet operate via a connection to the game server. Typically, games use a dedicated server application that collects data from players and distributes it to other players. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more video games associated with gameplays of a plurality of users. In that manner, back-end server support provides streaming of media (e.g., video, audio, etc.) of gameplays of a plurality of gaming applications to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display.

In other embodiments, the video game may be executed by a distributed game title processing engine (referenced herein as "game engine"). In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

In particular, game server 160 and/or the game title processing engine 111 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices 110, which include at least a CPU, a display and input/output (I/O). For example, users may access cloud game network 190 via communications network 150 using corresponding client devices 110 configured for receiving streaming media. The client device 110 can be a personal computer (PC), a mobile phone, a netbook, a personal digital assistant (PAD), handheld device, etc. In one embodiment, the network executing on the game server recognizes the type of device used by the client and adjusts the communication method employed. In other cases, client devices 110 use a standard communications method, such as hypertext markup language (html), to access the application on the game server over the network 150 (e.g., internet). It should be appreciated that a given video game or gaming application may be developed for a specific platform and a specific associated controller device. However, when such a video game is made available via a game cloud system 190 as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In one embodiment, client device 110 may be configured as a thin client providing interfacing with a back end server (e.g., game server 160 of cloud game network 190) configured for providing computational functionality (e.g., including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. In still other embodiments, for independent local processing the game title processing engine 111 includes basic processor based functions for executing a video game and services associated with the video game, and is described below with reference to the cloud game network 190. The game logic is stored on the local client device 110 and is used for executing the video game. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In particular, client device 110 of a corresponding user (not shown) is configured for requesting access to games over a communications network 150, such as the internet, and for rendering for display images generated by a video game executed by the game server 160, wherein encoded images are delivered to the client device 110 for display in association with the corresponding user. For example, the user may be interacting through client device 110 with an instance of a video game executing on a game processor of game server 160 in association with gameplay of a corresponding user, such as through input commands that are used to drive the gameplay. Client device 210 may receive input from various types of input devices, such as game controllers, tablet computers, keyboards, gestures captured by video cameras, mice, touch pads, audio input, etc. More particularly, an instance of the video game is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. In one embodiment, a display includes an HMD (e.g., displaying VR content). In some embodiments, the rendered images may be streamed to a smartphone or tablet, wirelessly or wired, direct from the cloud based services or via the client device 110 (e.g., PlayStation® Remote Play). Corresponding game logic (e.g., executable code) 115 implementing the video game is stored and accessible through a data store (not shown), and is used to execute the video game. Game title processing engine 111 is able to support a plurality of video games using a plurality of game logics, each of which is selectable by the user.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In addition, an audio normalizer 120 is configured to provide gender voice compensation using artificial intelligence. The audio normalizer 120 may be located at the cloud game network 190, such as when the corresponding video game is being executed by the game engine 111 for purposes of cloud gaming. The audio normalizer 120 may be located at a client device 110, such as when the corresponding video game is being executed by the local game engine 111 with our without back-end server support. In particular, audio normalizer 120 is configured to perform sound normalization of a player, such that sounds produced by the player are normalized to expected sounds known to the video game or the system implementing the video game. For example, audio normalizer is configured to perform gender voice compensation, such as when compensating for commands performed by different genders.

In some embodiments, artificial intelligence (AI) may be applied to provide sound normalization of a player. For example, a deep learning and/or machine learning engine 130 may be configured to implement an AI model 160 that is configured to classify and/or translate audio input provided by a player into sounds known by the video game or system implementing the video game. That is, the AI model 160 normalizes the audio input to a known sound. For example, the AI model 160 may normalize audio input provided by a player to control game play and/or translate the normalized audio input to a corresponding game command that is then executed by an instance of a corresponding video game (e.g., at a game engine 111 at the cloud game network 190 when cloud gaming, or at the client device when executing the video game locally.

Figure 2:
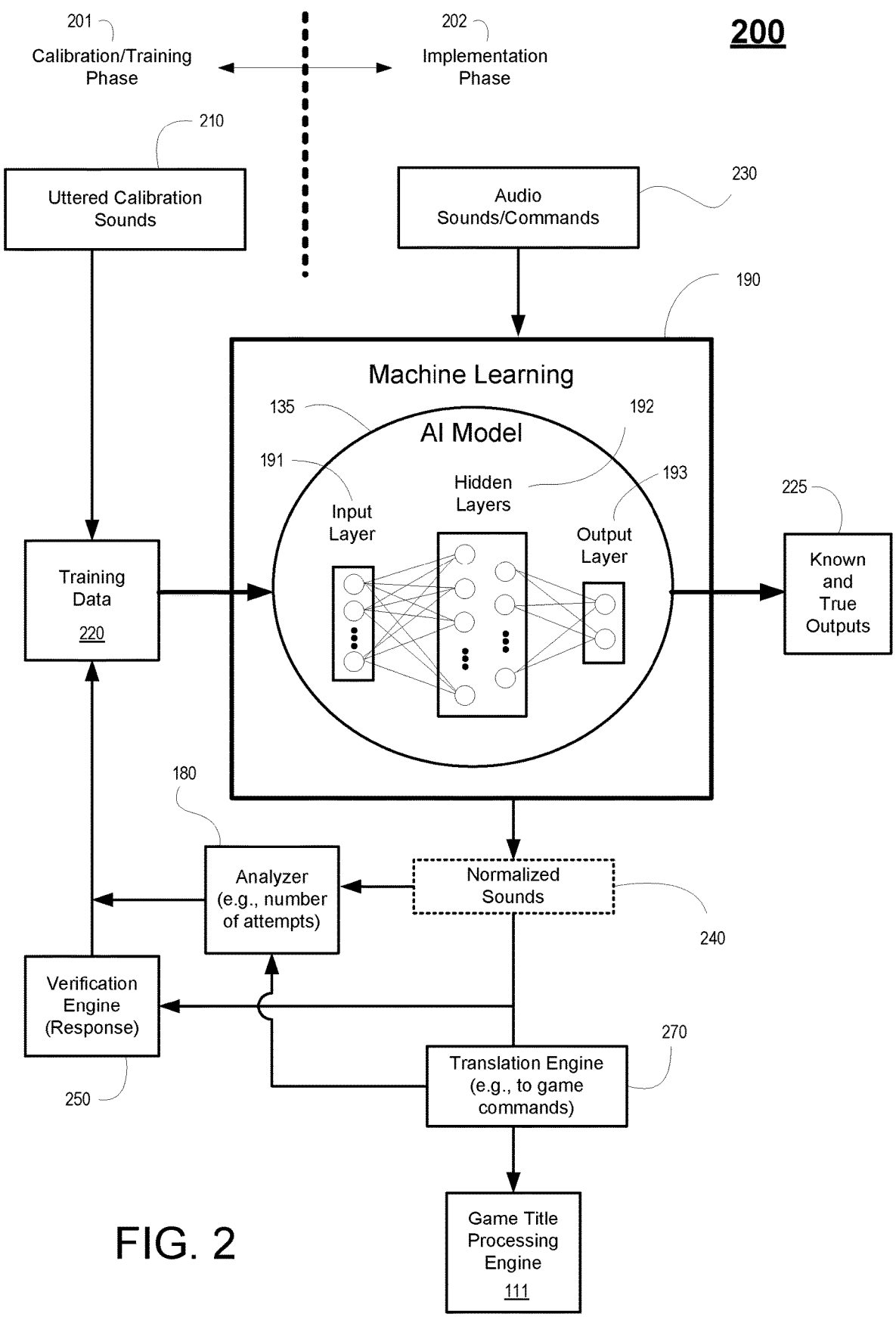
FIG. 2 is an illustration of a calibration/training phase and an implementation phase of an artificial intelligence model configured, in part, to perform gender voice compensation, in accordance with one embodiment of the disclosure.

FIG. 2 is an illustration of a calibration/training phase and an implementation phase of an artificial intelligence model configured, in part, to perform gender voice compensation, in accordance with one embodiment of the disclosure. In particular, system 200 is configured to train and implement an AI model 135 that is configured to normalize sounds of a player to expected sounds known to a corresponding video game and/or system implementing the video game, to include normalizing and/or translating audio commands from the player to game commands known to a corresponding video game and/or system. For example, the AI model may be implemented in the audio normalizer 120 of FIG. 1. The AI model 135 is updateable by providing feedback and/or trusted data for continual training. In one embodiment, the AI learning model is a machine learning model configured to apply machine learning to normalize sounds of a player to expected sounds known to a corresponding video game and/or system implementing the video game. In another embodiment, the AI learning model is a deep learning model configured to apply deep learning to normalize sounds of a player to expected sounds known to a corresponding video game and/or system implementing the video game, wherein machine learning is a sub-class of artificial intelligence, and deep learning is a sub-class of machine learning. As such, artificial intelligence is used to normalize sounds of a player to expected sounds known to a corresponding video game and/or system implementing the video game, to include normalizing and/or translating audio commands from the player to game commands known to a corresponding video game and/or system.

As shown, the AI model 135 may be configured for a training phase (e.g., learning to normalize sounds of a corresponding player), or for an implementation phase (e.g., normalizing sounds of a corresponding player). During the training phase, training data 220 may be provided as input to the machine learning system 190, which implements a training algorithm to fit the structure of the AI model 135 to the training data by tweaking the parameters of the AI model, so that the trained AI model provides an accurate relationship between input (training data) and output. Training and/or learning may be supervised using known and true outputs 225 (e.g., expected and/or known instances of sounds, or words, or phrases, etc.) associated with the training data 220. Training and/or learning may be unsupervised, wherein no known or true outputs are provided for the training data 220, such that input data is only provided and the AI model learns to normalize the sounds of a corresponding player to expected and/or known sounds of a video game or system implementing the video game. Also, training may implement both supervised and unsupervised training. For example, after performing unsupervised training, supervised learning may be performed with known data. Training and implementation of the AI model 135 is further described below.

In one embodiment, the machine learning process can also be performed ahead of time during a learning and/or calibration phase 201. The learning and/or calibration phase can include a series of sounds of one or more syllables, or word or words, or phrases that the player is instructed to speak or verbalize. For example, the player may be instructed to verbalize a sound used for calibration during the calibration phase 201. The AI model then receives an uttered sound 210 originating from the player, wherein the uttered sound may be used as training data 220. Each of the series of sounds, word or words, or phrases is associated with an expected series of sounds, word or words, or phrases (e.g., known and true outputs 225). The AI model 135 is configured to normalize the uttered sound to an expected sound (e.g., generating the normalized sound 240). A translation engine 270 is configured to translate the normalized sound to a translated sound, such as when translating a normalized audio command to a corresponding game command known to a video game or system implementing the video game, wherein the game command that is translated can be used during execution of the video game by the game engine 111.

The player may provide feedback (e.g., via verification engine 250 by providing a feedback response) as to whether the system understood or did not understand the series of sounds, word or words, or phrases used for calibration. That is, the player provides feedback on the normalized sound 240 and/or a translated sound or game command that is output from the translation engine 270 that is presented back to the player. For example, feedback may be performed and/or given on the normalized sounds 240, or feedback may be performed and/or given on the translated sounds and/or game commands that are translated and given as output from translation engine 270. In particular, the verification engine 250 receives a response originating from the player, for example, indicating whether the normalized sound output from the AI model 135 and/or the translated sound output from the translation engine 270 matches an expected and/or known sound (e.g., true outputs 225) that are associated with the sound used for calibration. The feedback (e.g., response) is provided to the AI model for training the AI model during the calibration phase 201, and more specifically will reinforce the machine learning or AI model 135 that is generated for the corresponding player. The AI model can then be used by a game or game engine to make adjustments on the fly to received verbal commands (e.g., normalize sounds and/or audio commands to expected sounds and/or game commands) so that they are usable during gameplay (e.g., executing the normalized and/or translated audio commands to game commands).

The machine learning engine 190 may be configured as a neural network used to train the AI model 135 through learning, in accordance with one embodiment of the disclosure. In one embodiment, machine learning engine 190 may be implemented to normalize sounds of a player to expected sounds known to a corresponding video game or system implementing the video game. Specifically, machine learning engine 190 is configured to analyze training data 220 during the training phase to build (e.g., train through learning) the AI model 135. As such, the training data 220 are fed to the machine learning engine 190, which utilizes artificial intelligence, including supervised learning algorithms, unsupervised learning algorithms, reinforcement learning, or other artificial intelligence-based algorithms to build the AI model 135.

The neural network in the machine learning engine 190 represents an example of an automated analysis tool for analyzing data sets to normalize sounds of a player. Different types of neural networks are possible for applying artificial intelligence. Though a machine learning engine applying machine learning is shown, it is understood that other AI techniques may be utilized, such as deep learning applied by a deep learning engine, in other embodiments. For example, the neural network supports machine learning that may be implemented by the machine learning engine 190. In another example, the neural network supports a deep learning network that may be implemented by deep learning engine, such as one set up as a Markov decision process (MDP) that supports a reinforcement learning algorithm. Accordingly, a deep neural network, a convolutional deep neural network, and/or a recurrent neural network using supervised or unsupervised training can be implemented.

Generally, the neural network in the machine learning engine 190 represents a network of interconnected nodes, such as an artificial neural network, and is used to train the AI model 135. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network implementing the AI model 135 includes a hierarchy of nodes. At the lowest hierarchy level, an input layer 191 exists. The input layer 191 includes a set of input nodes configured to receive the training data (e.g., calibrated sounds, feedback data, etc.).

At the highest hierarchical level, an output layer 193 exists. The output layer 193 includes a set of output nodes. An output node represents a decision (e.g., prediction) that relates to one or more components of a AI model 135, for example. As previously described, the output nodes may normalize sounds of a player to expected sounds known to a corresponding video game or system implementing the video game. These results can be compared to predetermined and true results 225 in order to refine and/or modify the parameters used by the machine learning engine 190 to iteratively determine the appropriate adjustments applied to corresponding sounds during normalization.

For example, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network in the machine learning engine 190 configured to build the AI model 135 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x) = \max(0,x)$.

The neural network in the machine learning engine 190 configured to build the AI model 135 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network in the machine learning engine 190 configured to build the AI model 195 can be from a same data domain. For instance, the neural network is trained for normalizing sounds of a player for a given set of inputs or input data (e.g., data collected during calibration). For example, the data domain includes calibration data collected during the calibration phase 201 that is considered as baseline input data. In another example, the training dataset is from different data domains to include input data other than baseline.

As such, the neural network in the machine learning engine 190 configured to build the AI model 135 may normalize sounds of a player to expected sounds known to a video game and/or system implementing the video game for a given set of inputs (e.g., training data including uttered calibration sounds performed during calibration phase 201). Based on these predictive results, the neural network 190 may also define an AI model 135 that is used to normalize the sounds of a corresponding player.

During an implementation phase 202 (also referred to as generalization), the AI model 135 is used to normalize and/or translate audio input (e.g., sounds, or audio commands 230, etc.) to expected sounds (e.g., expected game commands) known to a corresponding video game or system implementing the video game based on the configuration of the AI model, as previously described. For example, the AI model 135 provides as an output a normalized sound 240 for a given sound or audio command provided as input. In addition, the normalized sound may be further provided to a translation engine 270 that is configured to translate the normalized sound to a corresponding game command known to the video game or system implementing the video game. In one embodiment, the translation process is incorporated into the AI model 135. In another embodiment, the translation process is performed independent of the AI model 135, such as by the translation engine 270, that is configured to learn to normalize and/or translate a sound provided as input to an expected sound or game command known to the video game or system implementing the video game.

In addition, the player may provide feedback during live game play as to the performance of the AI model 135, such as through the verification engine 250 (providing a feedback response), similar to the process used during the calibration phase 201. In addition, analyzer 180 may be configured to analyze the normalized sounds 240 and the output from the translation engine to provide additional feedback. For example, the analyzer 180 may determine that the player is repeating an audio command multiple times in an effort for the video game to execute a proper game command. Each command in the series of audio commands provided may be similar to each other, or may be slightly different, or may have some unique characteristic indicating that the commands are unsuccessful (e.g., quick succession of repeated commands). The analyzer 180 may determine that ultimately an audio command provided as input is successful. As such, feedback may be provided indicating sounds and/or audio commands that do not match an expected sound or game command, and feedback may also be provided indicating the sound and/or audio command that ultimately matches the expected sound or game command. The information provided as feedback may be newly included within the training data 220, and provided as input into the machine learning engine for purposes of updating the AI model 135. Because the information is verified (e.g., by the player or the analyzer 280), the machine learning engine could apply a supervised learning algorithm by assigning the verified output (e.g., normalized sounds 240 or game command output by the translation engine 270) as being a true output 225 when updating the AI model, in one embodiment.

Figure 3:
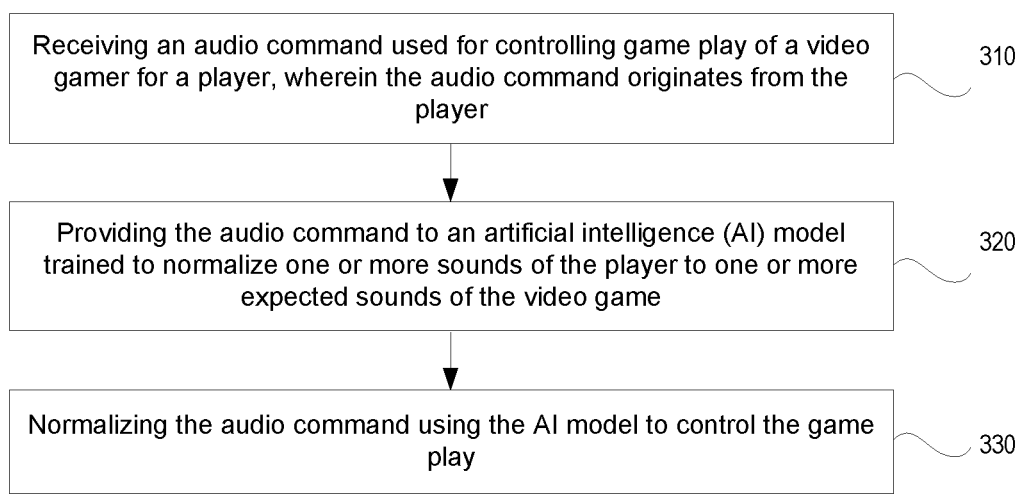
FIG. 3 is a flow diagram illustrating a method for gaming including the normalizing of audio commands from a player to game commands known to a corresponding video game for a game play of the player, in accordance with one embodiment of the present disclosure.

With the detailed description of the client system 110, cloud game network 190, audio normalizer 120, system 200, AI processor, machine learning engine 190, and AI model 160 of FIGS. 1-2, flow diagram 300 of FIG. 3 discloses a method for gaming including the normalizing of audio commands from a player to game commands known to a corresponding video game for a game play of the player, in accordance with one embodiment of the present disclosure. The operations performed in flow diagram may be implemented by one or more of the entities previously described components, and also system 200 described in FIG. 2 that is configured to normalize sounds of a player to expected sounds known to a corresponding video game and/or system implementing the video game, to include normalizing and/or translating audio commands from a player to game commands known to a corresponding video game for a game play of the player, in some embodiments. For example, normalization and/or translation is performed when a player is providing voice input, such as when providing audio commands used to control game play of a video game. In particular, the method 300 is performed in order to use machine learning to detect differences in the enunciation of sounds, or specific words, or combinations of letters and words when providing audio input, and to normalize the audio input to an expected sound, or word, or words. The machine learning process can be executed in real time during gameplay, and can make adjustments based on the learned differences in the inputs provided by the current player.

At 310, the method includes receiving an audio command used for controlling game play of a video game for a player. For example, the audio command originates from the player, and is communicated via a client device of the player. In particular, the audio command may be a sound of one or more syllables, including one or more words, or a phrase, etc. The sound provided as the audio command may be intended to mimic an expected sound, or the sound may be intended not to mimic but to represent the expected sound (e.g., when the player assigns a sound or word or phrase to an expected sound or word or phrase) that is known to the video game or system implementing the video game.

At 320, the method includes providing the audio command to an AI model trained to normalize one or more sounds of the player to one or more expected sounds of the video game. In particular, different players may enunciate a particular sound differently, which may not match or be close to an expected sound. Each player may have a corresponding AI model that is configured to normalize sounds. As such, an AI model of a player is configured to normalize sounds provided by that player to expected sounds known the video game or system implementing the video game.

At 330, the method includes normalizing the audio command using the AI model to control the game play. In particular, sometimes the audio command provided by the player may result in variations in the enunciation of the sounds, words, and phrases. That is, different players may enunciate a particular sound differently. The variations may be due to different pitches in the voices of different players. For example, a voice of a woman may have a higher pitch when compared to the voice of a man, or when compared to the voice of a child. As a result, enunciation of a sound, or word, or phrase between the woman and the man and/or child woman may be substantially different. As such, some sounds, or words, or phrases uttered by a woman or child may not be understood, since a system or game may be expecting the pitch and sound that is typically uttered by a male. Normalization is performed to normalize the sound provided as the audio command to an expected sound.

For example, when the audio command is provided to control game play of a video game, it is necessary for the audio command to be understood by the video game or the system implementing the video game. As such, normalization is performed on the audio command to normalize the one or more sounds of the audio command to one or more expected sounds known to the video game or system implementing the video game. For example, normalization could include adjusting a pitch of the one or more sounds of the audio command provided by the player to an expected pitch known to the video game or system implementing the video game. Also, normalization could include adjusting an enunciation of the one or more sounds of the audio command to one or more expected sounds known to the video game or system implementing the video game.

As such, one or more adjustments are made to the audio input, and include applying a normalization to the audio input or audio command, so that differences between voices of different users, men, women, or children to include different pitches and different enunciations of sounds can be filtered, such that the corrected sound or word or phrase is recognized by the video game and/or system implementing the video game. For example, a particular player may enunciate certain words or sounds that consistently emphasizes specific letters or deemphasizes specific letters. During normalization, that differentiation in enunciation can be identified by the AI model of the corresponding player, and then normalized to an expected sound or word or phrase that is known to the video game or system implementing the video game.

Also, in other embodiments, normalization can be performed for users with speech impediments. In particular, the AI model can be used to normalize sounds that have been enunciated with speech impediments, such as when the player is not properly enunciating the audio command. That is, the sounds (e.g., audio command) enunciated by a player with speech impediments can be adjusted during the normalization process to an expected sound known to the video game and/or system implementing the video game.

In addition, the method includes translating the audio command that is normalized to a corresponding game command. For example, the identified and/or normalized enunciation of a sound is translated to an expected enunciation of the native video game or system implementing the video game. In one implementation, the expected enunciation is a game command. In that manner, the model can then be used by a game or game engine to make adjustments on the fly to received verbal or audio commands so that they are usable during gameplay of a corresponding player. That is, the audio command that is normalized is translated to a game command that is known to the video game. In one embodiment, the AI model performs the translation. In other embodiments, a dedicated system is used to perform the translation based on normalized sounds. Further, the video game is then executed using the game command translated from the normalized audio command.

Depending on where the video game is being executed (e.g., by a corresponding game engine), the AI model providing the normalization and or translation of the audio command may be executing at a local device or a back-end server. For example, the normalization and/or translation may be performed by the AI model at a client device when the video game is being executed locally. In other implementations, the normalization and or translation of the audio command may be executing at a back-end server, such as when the video game is being executed at a cloud gaming system. In still other implementations, the normalization and or translation of the audio command may be executing at a remote server that is remote from a local client device and may be remote from the cloud gaming system.

Figure 4:
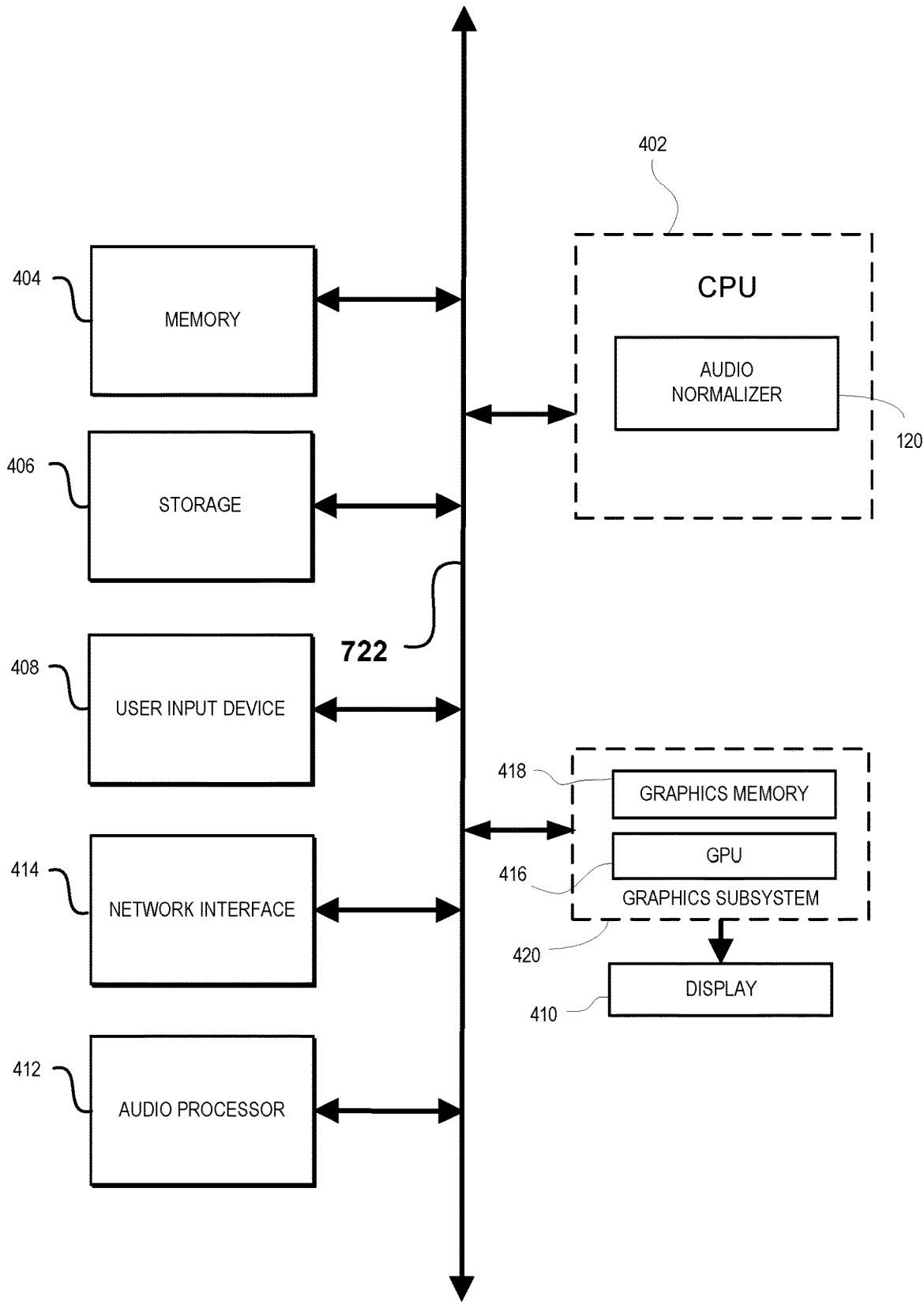
FIG. 4 illustrates components of an example device that can be used to perform aspects of the various embodiments of the present disclosure.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be a localized to a player playing a game segment (e.g., game console), or remote from the player (e.g., back-end server processor), or one of many servers using virtualization in a game cloud system for remote streaming of gameplay to clients.

CPU 402 may be configured to implement an abuse response engine 145 and/or an accolade system 120. As previously described, the abuse response engine 145 is configured to classify player behavior, and to take additional actions in responses to the classifications. For example, a player may be determined to be exhibiting undesirable behavior (e.g., being abusive towards another player), and a warning may be given to that player to stop the undesirable behavior. Also, the accolade system 120 is configured to issue accolades to players that are exhibiting desirable behavior. In that manner, desirable behavior among players may be promoted within an online gaming community.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 410, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 408, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs. In one embodiment, GPU 416 may be implemented within an AI engine (e.g., machine learning engine 190) to provide additional processing power, such as for the AI, machine learning functionality, or deep learning functionality, etc.

The graphics subsystem 420 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

In other embodiments, the graphics subsystem 420 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river)

operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for training and implementing an artificial intelligence (AI) model that is configured to perform gender voice compensation, such as when compensating for commands performed by different genders.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for gaming, comprising:
   receiving an audio command used for controlling game play of a video game for a player, wherein the audio command originates from the player;
   providing the audio command to an artificial intelligence (AI) model trained to normalize one or more sounds of the player to one or more expected sounds of the video game;
   normalizing the audio command using the AI model to control the game play;
   providing an instruction to verbalize a calibrated sound during a calibration phase;
   receiving an uttered sound originating from the player;
   normalizing the uttered sound to generate a translated sound;
   presenting the translated sound;
   receiving a response originating from the player indicating whether the translated sound matches the calibrated sound; and
   providing the response as feedback to the AI model for training the AI model during the calibration phase.

2. The method of claim 1, further comprising:
   translating the audio command that is normalized to a game command known to the video game using the AI model; and
   executing the video game using the game command.

3. The method of claim 1, further comprising:
   executing the AI model at a local device or a back-end server when performing the normalizing the audio command.

4. The method of claim 1,
   wherein the audio command is a word or a phrase.

5. The method of claim 1,
   wherein the calibrated sound is a word or a phrase.

6. The method of claim 1, wherein the normalizing the audio command includes:
   adjusting a pitch of the audio command to an expected pitch known to the video game.

7. The method of claim 1, wherein the normalizing the audio command includes:
   adjusting an enunciation of the audio command to an expected sound known to the video game.

8. A non-transitory computer-readable medium storing a computer program for performing a method, the computer-readable medium comprising:
   program instructions for receiving an audio command used for controlling game play of a video game for a player, wherein the audio command originates from the player;
   program instructions for providing the audio command to an artificial intelligence (AI) model trained to normalize one or more sounds of the player to one or more expected sounds of the video game;
   program instructions for normalizing the audio command using the AI model to control the game play;
   program instructions for providing an instruction to verbalize a calibrated sound during a calibration phase;
   program instructions for receiving an uttered sound originating from the player;
   program instructions for normalizing the uttered sound to generate a translated sound;
   program instructions for presenting the translated sound;
   program instructions for receiving a response originating from the player indicating whether the translated sound matches the calibrated sound; and
   program instructions for providing the response as feedback to the AI model for training the AI model during the calibration phase.

9. The non-transitory computer-readable medium of claim 8, further comprising:
   program instructions for translating the audio command that is normalized to a game command known to the video game using the AI model; and
   program instructions for executing the video game using the game command.

10. The non-transitory computer-readable medium of claim 8, further comprising:

program instructions for executing the AI model at a local device or a back-end server when performing the normalizing the audio command.

11. The non-transitory computer-readable medium of claim 8,
wherein in the method the audio command is a word or a phrase.

12. The non-transitory computer-readable medium of claim 8, wherein the program instructions for normalizing the audio command includes:
program instructions for adjusting a pitch of the audio command to an expected pitch known to the video game; or
program instructions for adjusting an enunciation of the audio command to an expected sound known to the video game.

13. A computer system comprising:
a processor;
memory coupled to the processor and having stored therein instructions that, if executed by the computer system, cause the computer system to execute a method for gaming, comprising:
receiving an audio command used for controlling game play of a video game for a player, wherein the audio command originates from the player;
providing the audio command to an artificial intelligence (AI) model trained to normalize one or more sounds of the player to one or more expected sounds of the video game;
normalizing the audio command using the AI model to control the game play;
providing an instruction to verbalize a calibrated sound during a calibration phase;
receiving an uttered sound originating from the player;
normalizing the uttered sound to generate a translated sound;
presenting the translated sound;
receiving a response originating from the player indicating whether the translated sound matches the calibrated sound; and
providing the response as feedback to the AI model for training the AI model during the calibration phase.

14. The computer system for gaming of claim 13, the method further comprising:
translating the audio command that is normalized to a game command known to the video game using the AI model; and
executing the video game using the game command.

15. The computer system for gaming of claim 13, the method further comprising:
executing the AI model at a local device or a back-end server when performing the normalizing the audio command.

16. The computer system for gaming of claim 13,
wherein in the method the audio command is a word or a phrase.

17. The computer system of claim 13, wherein in the method the normalizing the audio command includes:
adjusting a pitch of the audio command to an expected pitch known to the video game; or
adjusting an enunciation of the audio command to an expected sound known to the video game.

* * * * *